United States Patent
Smorodinsky

(10) Patent No.: US 6,859,929 B1
(45) Date of Patent: Feb. 22, 2005

(54) METHOD FOR SERVER METAFARM CONFIGURATION OPTIMIZATION

(75) Inventor: Lev Smorodinsky, Laguna Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 813 days.

(21) Appl. No.: 09/705,441

(22) Filed: Nov. 2, 2000

(51) Int. Cl.[7] ............................................. G06F 15/163
(52) U.S. Cl. ..................................... 719/310; 718/105
(58) Field of Search ......................... 719/310; 718/105

(56) References Cited

U.S. PATENT DOCUMENTS

| | | | | |
|---|---|---|---|---|
| 6,006,259 A | * | 12/1999 | Adelman et al. | 709/223 |
| 6,178,160 B1 | * | 1/2001 | Bolton et al. | 370/255 |
| 6,374,297 B1 | * | 4/2002 | Wolf et al. | 709/226 |
| 6,389,448 B1 | * | 5/2002 | Primak et al. | 718/105 |
| 6,496,948 B1 | * | 12/2002 | Smorodinsky | 714/37 |
| 6,571,283 B1 | * | 5/2003 | Smorodinsky | 709/220 |

* cited by examiner

Primary Examiner—Meng-Al T. An
Assistant Examiner—LeChi Truong
(74) Attorney, Agent, or Firm—Alfred W. Kozak; Mark T. Starr; Lise A. Rode

(57) ABSTRACT

A method and a novel estimator program are provided for Server Metafarm optimization for a given particular large number of the Metafarm users/clients "L" by balancing a number of separate Server Farms and their availability requirements. By the optimization of the Metafarm is herein meant the process of finding the optimum values of the selected optimization parameters (such as a number of Server Farms and/or a Redundancy Factor value) that deliver the optimum value for the selected optimization criterion (such as Server Metafarm availability) and a given set of input data.

12 Claims, 4 Drawing Sheets

METHOD FOR SERVER METAFARM CONFIGURATION OPTIMIZATION

CROSS-REFERENCES TO RELATED APPLICATIONS

This application in related to co-pending applications, U.S. Ser. No. 08/550,603 entitled "Estimator Program for Estimating the Availability of an Application Program That Runs in a Cluster of at Least Two Computers"; U.S. Ser. No. 09/443,926, entitled "Method for Estimating the Availability of an Operating Server Farm", and U.S. Ser. No. 09/474,706, entitled "Method for Server Farm Configuration Optimization" which applications are incorporated herein by reference.

FIELD OF THE INVENTION

This invention relates to data processing systems of the type which include a Server Metafarm that includes one or more Server Farms that execute application programs for multiple clients (users); and more particularly, this invention relates to methods for optimizing the "Server Metafarm size" by balancing a number of Server Farms and availability requirements in the above type of data processing systems.

BACKGROUND OF THE INVENTION

The co-pending application "Estimator Program for Estimating the Availability of an Application Program That Runs in a Cluster of at Least Two Computers" referenced above involves an estimator program to perform method steps for estimating the availability of an application program that runs on any "server" in a cluster of at least two servers. By "availability of an application program" is meant the probability that at any particular time instance, at least one of the servers in a cluster (farm) will actually be servicing requests from external workstations able to use the application program.

In one embodiment, the so-called estimator program begins by receiving input parameters which include (i) multiple downtime periods for each computer in the cluster (farm) that occur at respective frequencies due to various downtime sources, and (ii) an application "failover" time period for switching the running of the application program from any one computer to another computer which is operable. From these input parameters, the described estimator program estimates first and second annual stoppage times, then determines the availability of the application program on the cluster of computers which is derived from the sum of the first and second annual stoppage times.

Thus, as discussed, the estimator program of the previously-described invention estimated a first annual stoppage time for the application program due solely to the concurrent stoppage of all of the computers, as a function of the ratio of a single computer virtual downtime period over the single computer virtual time between stops. Then subsequently, the estimator program was used to estimate a second annual stoppage time for the application program, due solely to the switching for running the application program from one computer to another computer as a function of the single virtual stoppage rate and the application failover time period. From this, the estimator program determined the availability of the application program on the cluster of computers by deriving the sum of the first and second annual stoppage times.

The estimator program method was based on the assumption that "application availability" was to be determined from four factors which were:

(i) single-server hardware reliability;
(ii) maintenance, support, and service strategies;
(iii) user application and environment;
(iv) failover or system reconnection mechanism and application recovery mechanism.

The prior estimation parameters which were described in the co-pending application U.S. Ser. No. 08/550,603 did not take into consideration the total number of operating Server Farm clients and the normal single server workload of users involved with each single server. Further, this earlier application did not provide a recommendation or estimate regarding the number of servers required in the Server Farm (or cluster) which would meet the customers' performance and redundancy level requirements, nor did it establish an optimum farm configuration.

The method of the co-pending application U.S. Ser. No. 09/443,926, entitled "Method for Estimating the Availability of an operating Server Farm" extended the area of the original method application for Server Farms designed to serve user communities with a required particular number of customers. This method involving the Server Farm size and availability calculations is based on (1) the single server parameters such as (a) the meantime to failure (MTTF), (b) the meantime to repair (MTTR), and (c) the single server application performance benchmarks, and (2) individual customer preferential requirements, involving (a) the total number of Server Farm application users and (b) a desirable redundancy level.

This estimation method for availability uses the following definition of Server Farm availability. This definition is the probability that a Server Farm provides access to applications and data for a particular minimum number of users. As soon as the Server Farm can not serve this particular minimum number of users, it is considered failed. When some of the users have lost connections but can reconnect to other servers and continue to work, and the majority of users do not experience any interruptions in their work, the farm is not considered failed, if it can still serve this particular number of users.

A widely used approach to improve a system's availability beyond the availability of a single system is by using Server Farms with redundant servers. In this case, if one of the farm's servers fails, the "unlucky" users connected to this server will lose their connections, but will have an opportunity to reconnect to other servers in the farm and get access to their applications and data. If all of the "unlucky" users get access to their applications and data, the farm is considered "available." If at least one of the "unlucky" users fails to get access to his/her applications and data, it means that the Server Farm's redundancy was exhausted and the Server Farm is considered failed.

The parameters for MTTF and MTTR can be estimated as indicated in the cited prior U.S. Ser. No. 08/550,603 as a single computer virtual time between failures and a single computer virtual downtime period, respectively, for a particular application and user environment.

Therefore, the availability estimation method of the prior application U.S. Ser. No. 09/443,926 allows one to estimate such parameters of the Server Farm as number of servers, Server Farm availability, and Server Farm downtime, based on a set of input data. At the same time, however, this method did not provide any recommendations about optimum combinations of the Server Farm parameters that can be chosen at the Server Farm planning or design stage.

The method of the co-pending application U.S. Ser. No. 09/474,706, entitled "Method for Server Farm Configuration Optimization" involving the Server Farm size optimization is based on the input data that includes single server parameters similar to the prior application U.S. Ser. No. 09/443,926 and at least two new extra parameters which include: single server cost and the downtime cost. Additionally, this method included newly added steps of selecting an optimization parameter, selecting an optimization criterion, and using an optimization technique procedure to find the optimum value of the optimization parameter. Therefore the optimization method of the co-pending application U.S. Ser. No. 09/474,706 allows one to find the optimum configuration of the single Server Farm. At the same time, however, this method had some technical limitations. The original assumption, that the reliability of the workload balancing mechanism is much higher than the reliability of a single server running applications becomes questionable if the Server Farm size exceeds 100–120 servers. This peculiar problem arises in the situation where a very large number of users L, say 10,000, 50,000 or 100,000 users are involved.

The presently described new method improves Server Farm availability by using so called Metafarms divided into several Server Farms with a workload balancing mechanism that distributes workload as between the Server Farms and as between the servers that make up the Server Farms. The Metafarm availability definition is similar to the Server Farm availability definition. The Metafarm availability is the probability that a Metafarm provides access to applications and data for a particular minimum number of users. Therefore this is the probability that all Metafarm Server Farms are available.

The Metafarm design unlike Server Farm design may involve a new parameter—the number of Server Farms of equal size that make up a Server Metafarm. The number of Server Farms can be used as one of the Server Metafarm optimization parameters.

While the present invention may be shown in a preferential embodiment for a Metafarm that uses any workload balancing mechanism, it is not limited thereto, and can be used for any other data processing environment where the definition of the "Metafarm and Server Farm availability" can be applied.

Thus the object of the present invention is to provide a method for optimizing the Server Metafarm for delivery of service to this large number of users by balancing a number of Server Farms and their availability requirements. The method uses the fact that the decomposition of the Metafarm into several Server Farms can increase the Server Metafarm availability. The method will generate an optimum recommendation for the selected set of input data. For example, the input data can include parameters of the particular server that is used as a Metafarm building block and Server Metafarm availability can be selected as optimization criterion. In this case, the optimum Server Metafarm configuration can include the values of the number of Server Farms of equal size that make up a Server Metafarm and the number of servers in each Server Farm.

The method of generating such optimum configurations for this type of network involving large number of users "L" is described and developed in the succeeding exposition hereinbelow.

SUMMARY OF THE INVENTION

In accordance with the present invention, a novel estimator program performs method steps for the Server Metafarm optimization for a given particular large number of Metafarm users/clients "L" by balancing a number of separate Server Farms and their availability requirements. By the optimization of the Metafarm is herein meant the process of finding the optimum values of the selected optimization parameters (such as a number of Server Farms and/or a Redundancy Factor value) that deliver the optimum value (for the selected optimization criterion (such as Server Metafarm availability) and a given set of input data.

System performance in a Server Metafarm computing environment involves a particular number of concurrent users with the minimum required application response time and reliable access to their applications and data. Server Metafarm availability is the probability that a Server Metafarm provides a required system performance level. A Server Metafarm parameter that indirectly defines the Server Metafarm availability and performance is designated as a Redundancy Factor, that is a measure of the available system resources. The Redundancy Factor involves a difference between the maximum required performance and the nominal performance as a percentage of the maximum performance.

In one particular embodiment, the method uses a simplified Server Metafarm availability model. The model uses Server Metafarm availability as an optimization criterion. The Redundancy Factor and the number of Server Farms that make up the Metafarm are used as optimization parameters.

The method uses the fact that the decomposition of the Metafarm into several Server Farms can increase the server Metafarm availability.

Figure 1:
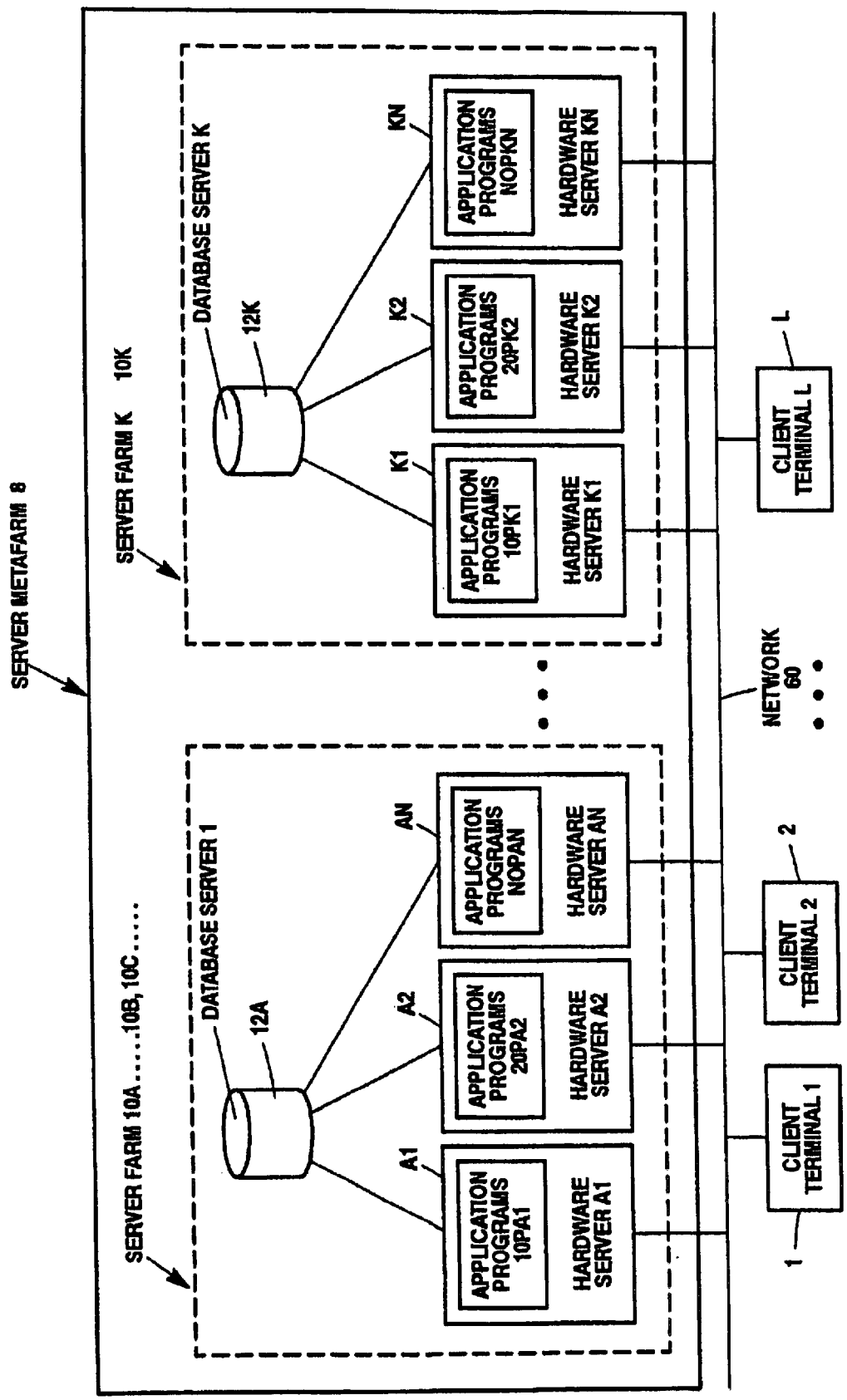
FIG. 1 is a drawing of a data processing system which includes an application Server Metafarm that executes application programs for multiple clients (users). This is an example of the typical system where the optimization method of balancing a number of Metafarm Server Farms and availability requirements can be applied.

Glossary List of Relevant Items:

1. AVAILABILITY: This is a measure of the readiness of the system and an application to deliver an expected service to the user with a required performance level. It may be described as a percentage of time that a system and an application are running as distinguished from the system being down for maintenance or repairs.

2. MEAN TIME TO FAILURE (MTTF): This is the average operating time between two failures, that can be estimated as the total operating time divided by the number of failures.

3. MEAN TIME TO REPAIR (MTTR): This is the average "downtime" in case of failure, that can be estimated as the total downtime divided by the number of failures.

4. DOWNTIME: The downtime or repair time for a single application server is the time interval required to restore the server and system back to normal business operation. At the end of the repair period the applications running on the repaired server are available to users. The downtime for a Server Farm is the time interval required to restore the nominal Server Farm performance.

5. ESTIMATOR PROGRAM: This is a program which performs method steps for estimating system parameters such as the availability of application programs running on any computer, server cluster, or server farm. This type of estimator program was the subject of co-pending applications U.S. Ser. No. 550,603 and U.S. Ser. No. 09/443,926, which are incorporated herein by reference.

6. SERVER METAFARM or METAFARM: This designates a group of identical Server Farms (see definition of the Server Farm below) that uses a workload balancing mechanism that distributes requests for services or applications to the available servers.

7. SERVER FARM: This designates a group of identical individual servers wherein each server can provide service to many single individual clients. The Server Farm can run enterprise class client/server applications (SAP, PeopleSoft, Microsoft SQL) or applications that are traditionally run on a single workstation (Microsoft Office 97). The Server Farm usually uses a workload balancing mechanism that distributes requests for services or applications to the available servers.

8. REDUNDANCY FACTOR (Rf): This is a measure of the additional number of users that can be added to the nominal number of users per server without exceeding the maximum number of users per server (server performance benchmark maximum of users). It is a difference between maximum and nominal performance as a percentage of the maximum performance. The Redundancy Factor can be calculated as 100 percent minus a usage factor Uf.

9. SERVER FARM AVAILABILITY CALCULATOR: This is an estimator program which estimates the availability for the Server Farm.

10. THIN CLIENT SERVER FARM AVAILABILITY CALCULATOR: This is one of the examples of the SERVER FARM AVAILABILITY CALCULATORS. Because thin-client configurations are intended to make applications available to multiple users at the same time, this calculator calculates the availability of a specified number of instances of an application (not just a single instance) where each application instance is being run at the server, but all the user input response is taking place at the client terminal. In this scenario, downtime occurs whenever the number of available instances of the application drops below the required specified number of instances.

11. USAGE FACTOR (Uf): This is the ratio of the nominal number of users per server to the maximum number of users per server (server performance benchmark maximum of users) times 100 percent.

12. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume. The OPTIMIZATION CRITERION is a focus of an optimum system design or configuration. Examples of the optimization criteria are system performance, system availability, and cost of ownership.

| | | |
|---|---|---|
| 13. MA | = | Metafarm Availability |
| 14. MMTTF | = | Metafarm Mean Time to Failure (MTTF) |
| 15. K | = | Number of Server Farms in the Metafarm. |
| 16. N | = | Number of Servers in the Server Farm |
| 17. P | = | Maximum number of concurrent users per server or single server application performance benchmark |
| 18. L | = | Total number of users being serviced by the Metafarm, L = K*N*P |

DESCRIPTION OF PREFERRED EMBODIMENT

As seen in FIG. 1, there is illustrated a schematic drawing of a Server Metafarm 8 that consists of a number of Server Farms. These Server Farms will involve a series of Farms designated 10A, 10B, 10C, . . . ,10K.

As a typical example, the Server Farm 11A involves a multiple number of servers designated A1, A2, A3, . . . ,AN. Each of these servers has their own individual application programs respectively shown as 10PA1, 20PA2, . . . ,N0PAN.

Likewise, each of the other Server Farms 10B, 10C, etc., has similar sets of hardware servers. For example, the Server Farm 10K of FIG. 1 has a set of servers designated K1, K2, . . . ,KN, and these servers respectively have their own programs 10PK1, 20PK2, . . . , K0PKN.

A network 60 connects client terminals designated 1,2, . . . ,L to enable connections to each server in the Server Metafarm. Additionally, each Server Farm has a database unit designated such as 12A for the Server Farm 10A. Likewise, the Server Farm 10K has a database unit designated 12K.

The network bus 60 of FIG. 1 provides connections from the multiple number "L" of client terminals shown as client terminal 1, 2, . . . L.

It should be understood here that this type of situation with the use of a Metafarm involves a large number of client users L, such as 10,000, 50,000, or 100,000 and so on. This is the reason that a Server Metafarm, such as Server Ketafarm 8, requires multiple numbers of Server Farms, such as 10A, 10B, 10C, . . . ,10K.

One of the major problems that arises in optimizing a configuration for a given total number of users L, is to decide how many Server Farms K of equal size N should be used to constitute the entire Server Metafarm, where N=the number of Servers in a Server Farm.

As was illustrated in U.S. Ser. No. 09/474,706, the Redundancy Factor is a key parameter in estimating Server Farm availability since it defines Server Farm size. The Redundancy Factor was used as one of the optimization parameters for the optimum Server Farm configuration. The definition of the Redundancy Factor can be applied to Metafarms also. For example, if a Metafarm should serve a large number of users where L=30,000 (Metafarm users) and each of the servers that make up this Metafarm can serve P=100 users, then a Metafarm size K=1 (it is just one farm) and a Server Farm size N (that is a minimum number of servers that can serve L users) is equal to N=30,000/100= 300 servers. This Metafarm does not have any redundant servers. According to the Metafarm availability definition, if any of the 300 servers fails, the Metafarm will be considered failed. To improve the Metafarm availability, redundant servers can be added. In case of the Redundancy Factor Rf=10%, the Metafarm resources to serve about 3,000 additional users are considered redundant. In terms of servers, it is about 30 additional servers. (30 is 10% of 300). Unfortunately, the original assumption (made in U.S. Ser. No. 09/474,706) that the reliability of the Server Farm workload balancing mechanism is much higher than the reliability of a single server running applications becomes questionable if the Server Farm size exceeds 100–120 servers. This is why the novel method described here uses the decomposition of the Metafarm into several Server Farms. The Metafarm can be divided into different number of the identical Server Farms with the same number of servers per Server Farm. The redundant servers can then be distributed evenly between Server Farms.

The goal of the reliable Metafarm design is to find a configuration with a minimum number of Metafarm servers (optimum configuration) that meets two major requirements:

1) performance requirement: to serve a given large number of users L;

2) availability requirement: provide a given Metafarm Availability value $M_A$ or a given Metafarm MTTF value $M_{MTTF}$.

Two optimization parameters that define the optimum configuration are the number of Server Farms K that make up the Metafarm and the Redundancy Factor that defines the overall number of servers.

Figure 2:
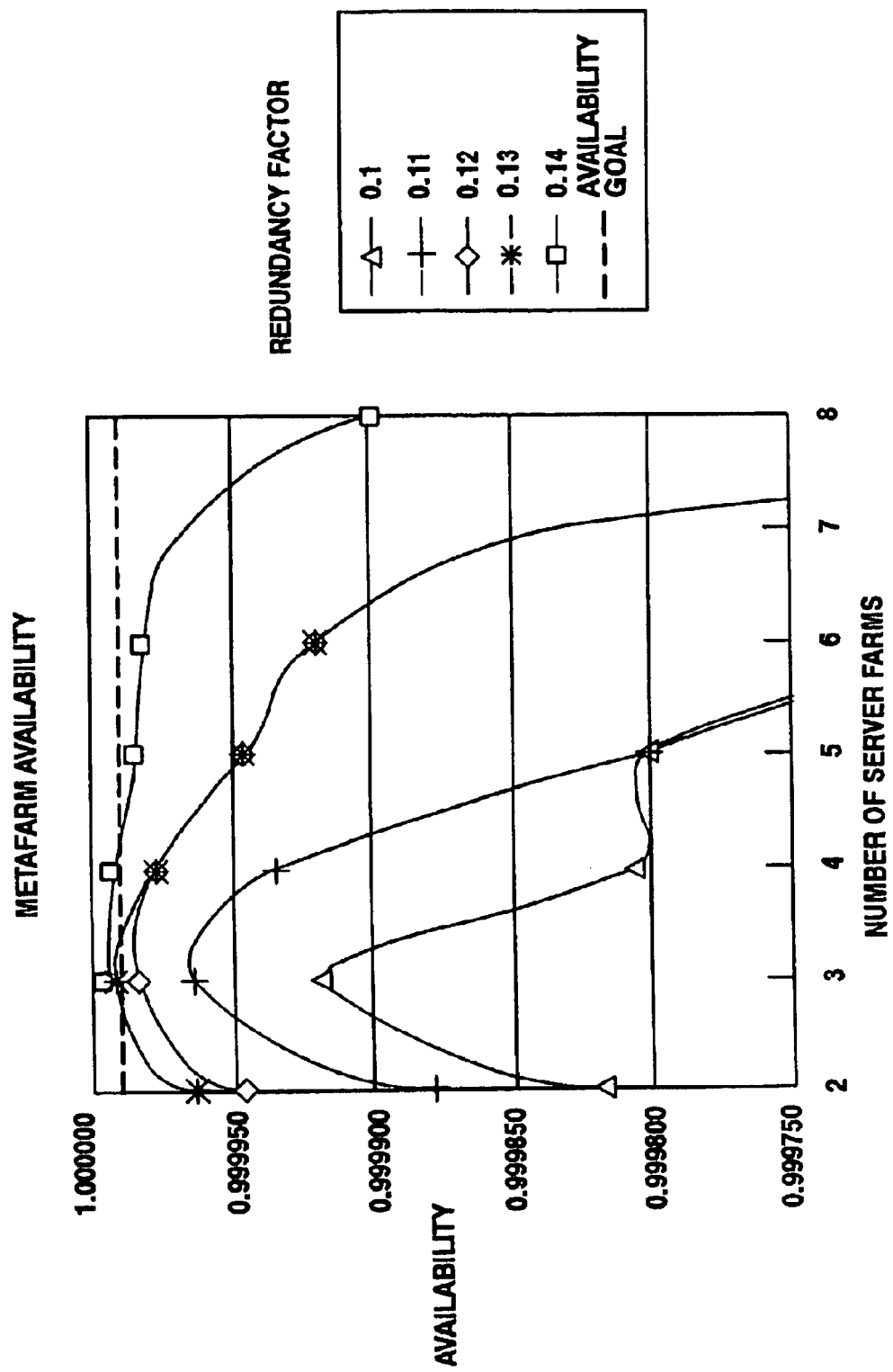
FIG. 2 shows an example of the optimization criterion as a function of one of the optimization parameters for a particular value of the second optimization parameter. Here, the optimization criterion is a Metafarm Availability and optimization parameters are a number of Metafarm Server Farms and a Redundancy Factoris.

FIG. 2 illustrates an example of the Metafarm optimization. FIG. 2 is a graphical plot of availability against the number "K" of Server Farms for a specified range of Redundancy Factors. The data used for optimization include the following:

a) performance requirement: provide services for L=30,000 users;

b) availability requirement: provide Metafarm Availability $M_A$=0.99999;

c) single server that runs application programs MTTF=1,500 hours;

d) single server that runs application programs MTTR=6 hours;

e) single server that runs application programs performance benchmark P=100 concurrent users;

f) Redundancy Factor domain is an interval (10%, 14%);

g) Number of Server Farms is a natural number 1, 2, . . . 10.

There are three configurations on FIG. 2 with availability MA that is greater or equal 0.99999. Two configurations are for a Redundancy Factor that is equal to Rf=14% (where the First configuration includes 345 servers that are distributed between 3 server farms. Each server farm contains 115 servers where 14 servers are considered redundant servers. The second configuration includes 344 servers that are distributed between 4 server farms. Each server farm contains 86 servers where 10 servers are considered redundant servers). The third configuration is for a Redundancy Factor that is equal to Rf=13%. (This third configuration includes 342 servers that are distributed between 3 server farms. Each server farm contains 114 servers where 13 servers are considered redundant servers). It is obvious, that the configuration with the smaller value of the Redundancy Factor Rf=13% and three Server Farms is the optimum configuration for this example, because it requires less servers than the two other configurations.

Figure 3:
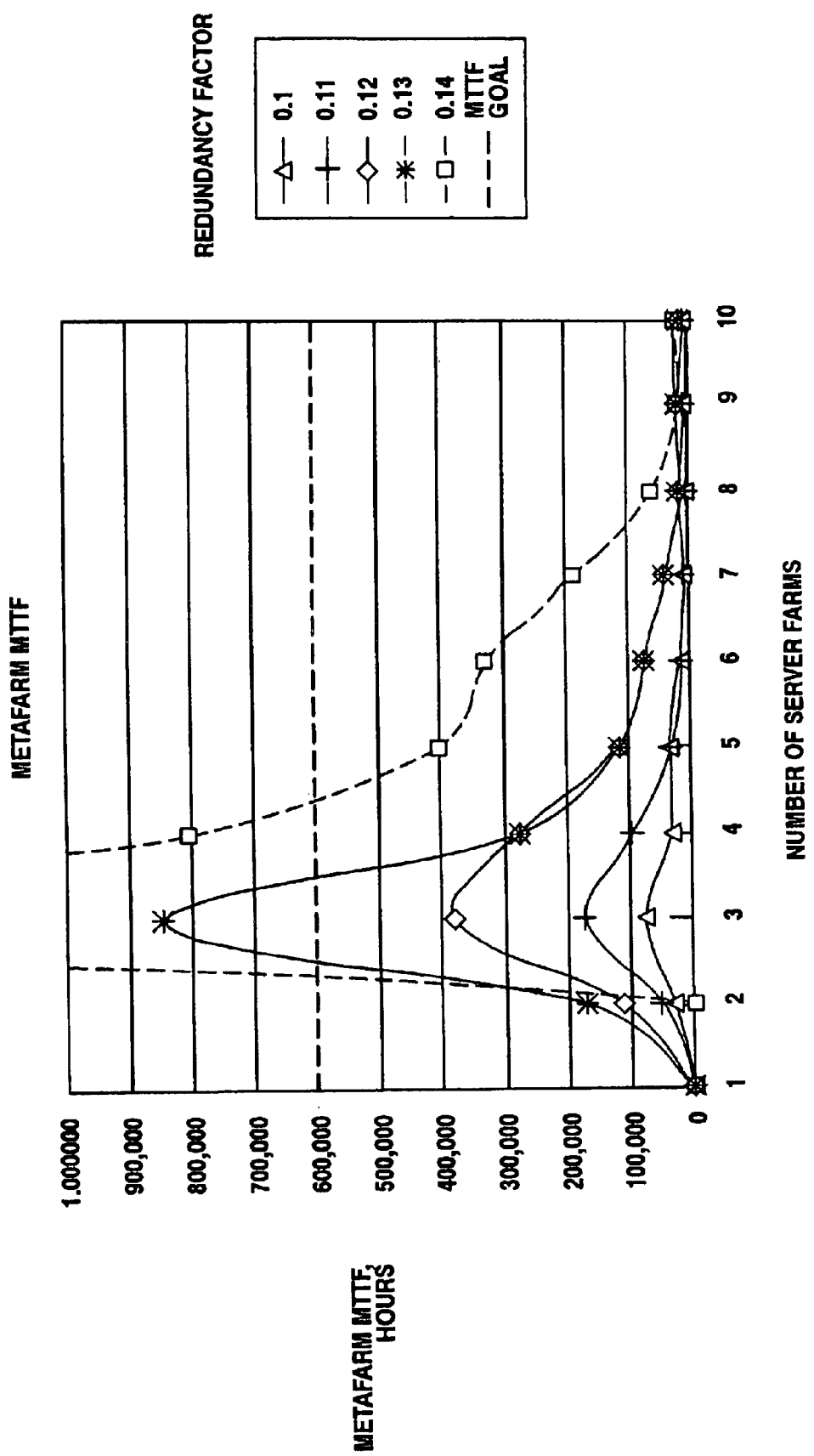
FIG. 3 shows an example of the optimization criterion as a function of one of the optimization parameters for a particular value of the second optimization parameter. Here, the optimization criterion is a Metafarm MTTF and optimization parameters are a number of Metafarm Server Farms and a Redundancy Factor.

FIG. 3 illustrates the same example of the Metafarm optimization where the availability requirement is given in the form of the Metafarm MTTF value where $M_{MTTF}$ is equal to 600,000 hours. Again, there are three configurations on FIG. 3 with Metafarm MTTF that is greater than or equal to 600,000 hours. Two configurations are for a Redundancy Factor Rf that is equal to 14% and one configuration is for a Redundancy Factor Rf that is equal to 13%. The value of the Metafarm MTTF for 3 Server Farms and Redundancy Factor Rf=14% is equal to 1,843,768 hours and is not shown in FIG. 3 due to limited graph size. The optimum configuration is the same as for the availability requirement in the form of the Metafarm Availability value that is equal to 0.99999: so that 3 Server Farms with the Redundancy Factor Rf of 13% is seen to have the least number of servers that deliver MTTF that is greater than the required goal (600,000 hours).

Now, in accordance with the present invention, steps are provided for optimization of a Server Metafarm designed to serve a particular large number of users "L". These steps will be described in conjunction with FIG. 4 that shows an estimator program, which performs method steps for estimating parameters of the optimum operating Server Metafarm.

Figure 4:
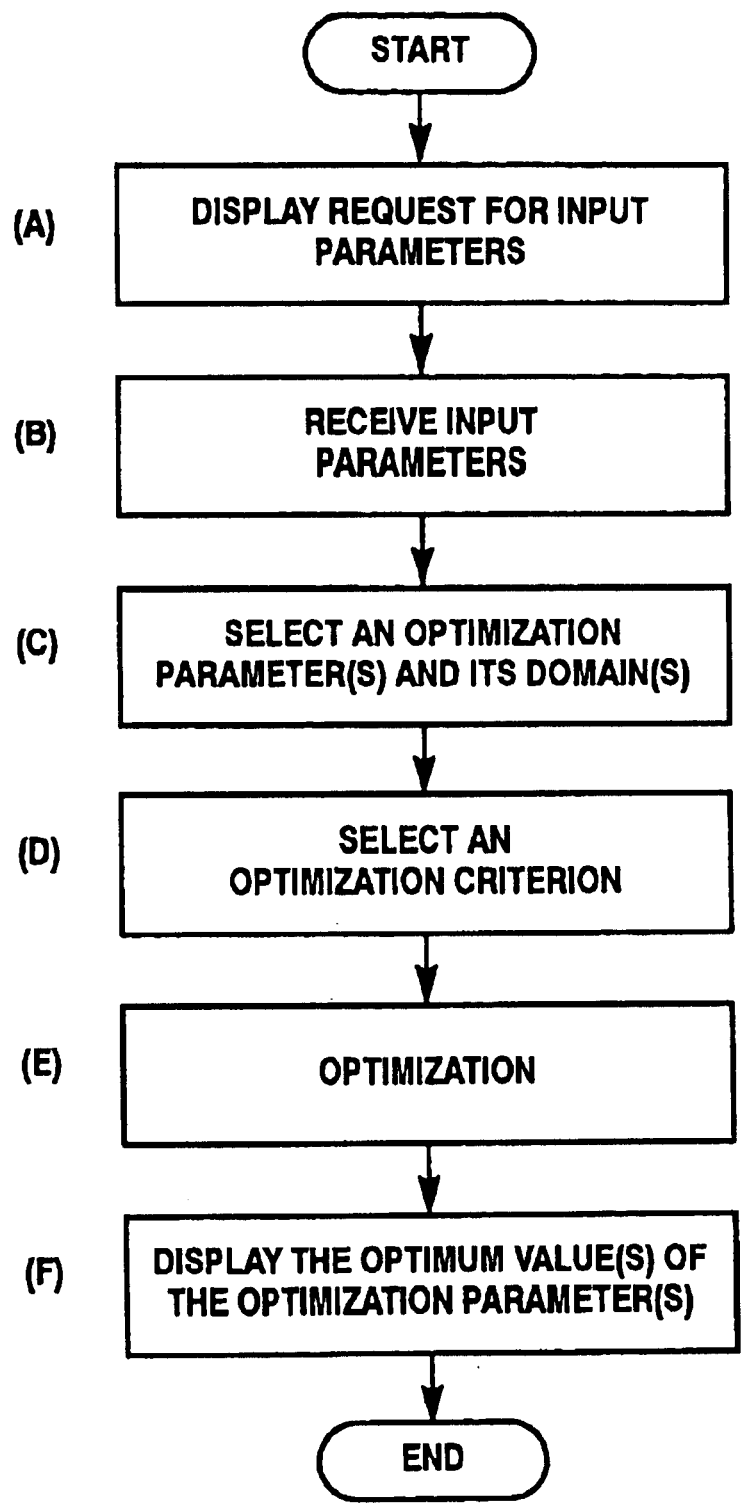
FIG. 4 is a flow chart which shows an estimator program, which performs method steps for estimating the optimum value of two of the possible optimization operating Server Metafarm designed to r overall number of clients "L".

In step A of FIG. 4, requests for the following input parameters are displayed: (1) performance requirement in the form of required large number of users for utilizing said Server Metafarm, (2) the maximum single-server workload "P" of concurrent users (the performance benchmark), (3) the Mean Time To Repair for a single server, and (4) Mean Time To Failure for a single server.

In step B of FIG. 4, the values of the requested input parameters are entered on the computer monitor by means of the keyboard.

In step C of FIG. 4, an optimization parameter (parameters) and its (their) domain is (are) selected. For example, in FIGS. 2 and 3, the selected optimization parameters are the Number of Server farms K and the Redundancy Factor Rf. The Number of Server Farms is a natural number 1, 2, . . . 10. The Redundancy Factor domain is an interval (10%,14%) that is the interval between 0 and 100 percent.

In step D of FIG. 4, an optimization criterion is selected. In FIG. 2, for example, the selected optimization criterion is the Redundancy Factor that should be minimized and, additionally, the selected constraint in the form of the minimum required Server Metafarm Availability value is the Metafarm Availability goal MA that should be greater or equal to 0.99999. In FIG. 3, for another example, the selected optimization criterion is the Redundancy Factor that should be minimized and, additionally, the selected constraint in the form of the minimum required Server Metafarm MTTF value is the Metafarm MTTF goal $M_{MTTF}$ that should be greater than or equal to 600,000 hours.

In step D of FIG. 4, optimization of the optimization criterion selected at step D occurs by one of the known optimization techniques described in the books: *Practical Optimization* by Philip Gill, Academic Press, 1981 and/or *Engineering Optimization: Methods and Applications* by G. V. Reklaitis and others, John Wiley & Sons, 1983. FIGS. 2 and 3 illustrate one of the simplest optimization techniques by the plotting of the graph for a set of values of the optimization parameters. Particularly, the used values of the Number of Server Farms K that make up the Metafarm are natural numbers 1, 2, . . . 10 and the used values of the Redundancy Factor are from 10% to 14% percent with steps of 1%: as for example, 10, 11, . . . 14%. If the accuracy of the calculation is not sufficient, then the value of a step can be reduced from 1% to 0.5%, etc.

In step F of FIG. 4, the optimum values of the optimization parameters are displayed. For example, in FIGS. 2 and 3, the optimum value of the Number of Server Farms K that make up the Metafarm is 3 Server Farms and the optimum value of the Redundancy Factor is 13% which corresponds to the Metafarm with 342 servers.

Described herein has been an optimization method and an estimator program for a Server Metafarm designed to serve a particular large number of clients L.

While a preferred implementation of the invention has been described, it should be understood that other implementations may be used which are still encompassed by the attached claims.

What is claimed is:

1. An estimator program that performs method steps for estimating parameters of an optimum operating Server Metafarm designed to serve a particular large number of clients-L comprising the steps of:
   (a) inputting a group of parameters involving at least one Server Metafarm parameter and at least one single server parameter;
   (b) selecting at least one Server Metafarm optimization parameter and its domain which indicates values that the server Farm optimization parameter may assume;
   (c) selecting a Server Metafarm optimization criterion that is a function of said Server Metafarm optimization parameter or parameters;
   (d) using an optimization technique to find the optimum value (values) of the optimization or parameter wherein said step (a) of inputting said group of parameters includes the steps of:
      (a1) selecting for input said particular large number of clients for utilizing said server Metafarm;
      (a2) selecting for input a maximum single server workload of users;
      (a3) selecting for input a mean time to repair value (MTTR) for a single server;
      (a4) selecting for input a mean time to failure (MTTF) for a single served.

2. The method of claim 1 wherein step (b) for selecting optimization parameters includes:
   (b1) selecting a number of Server Farms that make up a Server Metafarm which is any natural integer number of servers wherein each Server Farm is the same size, in number of servers, as each other Server Farm.

3. The method of claim 1 wherein step (b) for selecting optimization parameters includes:
   (b2) selecting a Redundancy Factor having a domain which is an interval between 0 and 100 percent.

4. The method of claim 1 wherein step (b) for selecting optimization parameters includes:
   (b3) selecting a number of Server Farms of equal size that make up a Server Metafarm which number is any natural integer number of servers, and,
   (b4) selecting a Redundancy Factor having a domain which is an interval between 0 and 100 percent.

5. The method of claim 1 wherein step (c) for selecting said optimization criteria includes:
   (c1) selecting an optimization function which is the Server Metafarm Mean Time To Failure.

6. The method of claim 1 wherein step (c) for selecting said optimization criteria includes:
   (c2) selecting an optimization function which is the Server Metafarm Availability.

7. The method of claim 1 wherein step (c) for selecting said optimization criteria includes:
   (c3) selecting an optimization function which is the Redundancy Factor that should be minimized and, additionally, selecting a constraint in the form of the minimum required Server Metafarm Mean Time To Failure value.

8. The method of claim 1 wherein step (c) for selecting said optimization criteria includes:
   (c4) selecting an optimization function which is the Redundancy Factor that should be minimized and, additionally, selecting a constraint in the form of the minimum required Server Metafarm Availability value.

9. The method of claim 1 wherein step (d) for using said optimization procedure includes the steps of:
   (d1) selecting a value of said optimization parameters from said domain;
   (d2) calculating a value for said optimization criterion;
   (d3) making an evaluation decision about the end or the continuation of said optimization procedure.

10. The method of claim 9 wherein step (d3) involves the decision to stop the procedure if the optimum number of Server Farms in the configured Server Metafarm is determined.

11. The method of claim 9 wherein step (d3) includes the step of:
    (d3a) continuing the optimization procedure if the optimum number for each single Server Farm size is not yet determined, by repeating said step (d1) with another value of said optimization parameter (parameters) from said domain (domains).

12. An estimator program that performs method steps for estimating parameters of an optimum operating Server Metafarm designed to serve a particular large number of clients comprising the steps of:
    (a) inputting a group of parameters involving at least one Server Metafarm parameter and at least one single server parameter said inputting including the steps of:
       (a1) selecting for input said particular number of clients for utilizing said Server Metafarm;
       (a2) selecting for input a maximum single server workload of users;
       (a3) selecting for input a mean time to repair value (MTTR) for a single server;
       (a4) selecting for input a mean time to failure (MTTF) for a single server;
    (b) selecting at least one Server Metafarm optimization parameter and its domain which indicates the values that the Server Farm optimization parameter may assume, said selecting of said optimization parameter including the steps of:
       (b1) selecting a number of Server Farms of equal size that make up a Server Metafarm which number is any natural integer number of servers, and,
       (b2) selecting a Redundancy Factor having a domain which is an interval between 0 and 100 percent;
       (b3) selecting a number of Server Farms that make up a Server Metafarm which is any natural integer number of servers wherein each Server Farm is the same size, in number of servers, as each other Server Farm;
    (c) selecting a Server Metafarm optimization criterion that is a function of said Server Metafarm optimization parameter or parameters, said selecting including the steps of:
       (c1) selecting an optimization function which is the Server Metafarm Mean Time To Failure;
       (c2) selecting an optimization function which is the Server Metafarm Availability;
       (c3) selecting an optimization function which is the Redundancy Factor that should be minimized and, additionally, selecting a constraint in the form of the minimum required Server Metafarm Mean Time To Failure value;

(c4) selecting an optimization function which is the particular Redundancy Factor that should be minimized and, additionally, selecting a constraint in the form of the minimum-required Server Metafarm Availability value;

(d) using an optimization technique to find the optimum value (values) of the optimization parameter (parameters), said using an optimization technique including the steps of:

(d1) selecting a value of said optimization parameters from said domain;

(d2) calculating a value for said optimization criterion;

(d3) making an evaluation decision about the end or about the continuation of said optimization procedure;

(d4) continuing the optimization procedure if the optimum number for each single Server Farm size is not yet determined, by repeating said step (d1) with another value of said optimization parameter (parameters) from said domain (domains).

* * * * *